US011420386B2

(12) United States Patent
Lee

(10) Patent No.: US 11,420,386 B2
(45) Date of Patent: Aug. 23, 2022

(54) NOZZLE STRUCTURE APPLYING RF HEATING DEVICE FOR 3D PRINTER

(71) Applicant: WAVEPIA CO., LTD., Gyeonggi-do (KR)

(72) Inventor: Sang-Hun Lee, Gyeonggi-do (KR)

(73) Assignee: WAVEPIA CO., LTD., Gyeonggi-Do (KR)

( * ) Notice: Subject to any disclaimer, the term of this patent is extended or adjusted under 35 U.S.C. 154(b) by 45 days.

(21) Appl. No.: 17/009,136

(22) Filed: Sep. 1, 2020

(65) Prior Publication Data

US 2021/0323229 A1 Oct. 21, 2021

(51) Int. Cl.
*B29C 64/209* (2017.01)
*B29C 64/295* (2017.01)
*B29C 64/30* (2017.01)
*B33Y 30/00* (2015.01)

(52) U.S. Cl.
CPC .......... *B29C 64/209* (2017.08); *B29C 64/295* (2017.08); *B29C 64/30* (2017.08); *B33Y 30/00* (2014.12)

(58) Field of Classification Search
CPC ... B29C 64/118; B29C 64/209; B29C 64/295; B33Y 30/00; B22F 10/18; B22F 12/00; B22F 12/10; B22F 12/13; B22F 12/53
See application file for complete search history.

(56) References Cited

U.S. PATENT DOCUMENTS

| 7,041,944 B2 * | 5/2006 | Pilavdzic | B29C 48/865 |
| | | | 219/601 |
| 10,124,531 B2 * | 11/2018 | Duty | B29C 64/106 |
| 2005/0225000 A1 * | 10/2005 | Tabassi | B29C 45/27 |
| | | | 425/549 |
| 2014/0263534 A1 * | 9/2014 | Post | B29C 64/106 |
| | | | 226/196.1 |
| 2015/0165676 A1 * | 6/2015 | Chen | B33Y 30/00 |
| | | | 425/170 |
| 2017/0057168 A1 * | 3/2017 | Miller | B33Y 30/00 |
| 2017/0151704 A1 * | 6/2017 | Go | B29C 48/266 |
| 2017/0190116 A1 * | 7/2017 | Grosche | B29C 48/02 |
| 2018/0154580 A1 * | 6/2018 | Mark | B22F 3/1146 |

(Continued)

FOREIGN PATENT DOCUMENTS

KR 20160131954 11/2016

OTHER PUBLICATIONS

W. S. Tan: Proof of concept: "Application of induction heating to 3D print low melting point metal alloy", The UNSW canberra at ADFA Journbalof Undergraduate Engineering Research, Jan. 1, 2015), Retrieved from internet: httos://ojs.unsw.adfa.edu.au/index.php/juer/article/view/9 19/595 (Year: 2015).*

(Continued)

*Primary Examiner* — Manley L Cummins, IV
(74) *Attorney, Agent, or Firm* — IPLA P.A.

(57) ABSTRACT

A nozzle structure applying an RF heating device for a 3D printer, the structure includes: a nozzle unit for melting and discharging an inflowing material using heat transferred from the outside; a transfer unit for transferring the material to the nozzle unit; an RF nozzle heating unit for heating up the nozzle unit using a high frequency so that the material is melted in the nozzle unit; and a cooling unit for cooling down the heat discharged from the nozzle unit 100 to the outside.

4 Claims, 5 Drawing Sheets

(56) References Cited

U.S. PATENT DOCUMENTS

| | | | | |
|---|---|---|---|---|
| 2018/0169941 A1* | 6/2018 | Taniguchi | ............. | B33Y 10/00 |
| 2018/0200954 A1* | 7/2018 | Mukhopadhyay | ..... | B33Y 10/00 |
| 2018/0326743 A1* | 11/2018 | Lee | ......... | B41J 2/325 |
| 2019/0118252 A1* | 4/2019 | Bauer | ................. | B22F 10/20 |
| 2019/0160744 A1* | 5/2019 | Besim | ................. | B33Y 30/00 |
| 2020/0016823 A1* | 1/2020 | Hymas | ................ | B29C 64/118 |
| 2021/0213562 A1* | 7/2021 | Dogru | .................. | B23K 26/14 |

OTHER PUBLICATIONS

Induction Heating: Coil And System Design, McGraw-Hill Book Company Inc., New York, (1960) at 158 and 165; retrieved online Jan. 29, 2022. (Year: 1960).*

* cited by examiner

NOZZLE STRUCTURE APPLYING RF HEATING DEVICE FOR 3D PRINTER

BACKGROUND

The present invention relates to a nozzle structure applying an RF heating device for a 3D printer, which can effectively melt a material using an RF frequency at the nozzle of the 3D printer, and maintain a proper temperature at the nozzle by minimizing transfer of heat, which is provided to the nozzle to melt the material, to the body.

A 3D printer is a system for outputting a three-dimensional product of an input drawing as if a printer prints a character or a picture.

According to a method of outputting a three-dimensional shape, 3D printers like this are largely divided into a stacking-type method of piling up one layer after another, and a cutting-type method of cutting out a bulk block.

The stacking-type method is a method of outputting a three-dimensional shape by stacking powder, plastic liquid or plastic yarn in layers of 0.01 to 0.08 mm, and the thinner the layer, a more precise shape may be obtained.

On the other hand, the cutting-type method is a method of outputting a three-dimensional shape by cutting a bulk block like carving, and although it is advantageous in that a finished product is more precise than those of the stacked-type method, there is a disadvantage in that the material is excessively consumed, a shape with a hollow inside like a cup is difficult to manufacture, and a coloring work should be separately performed.

Currently, 3D printers are mainly concentrated on the stacking-type method, and mainly a stereolithography (SLA) method, a selective laser sintering (SLS) method, and a fused deposition modeling (FDM) method are widely used.

The stereolithography (SLA) method is a method of outputting a three-dimensional product by projecting a laser on a water tank containing photocurable liquid resin to cure the portion in contact with the laser so as to be stacked from the bottom, and since the surface can be made smooth and precise, it is mainly used for manufacturing a product where details are important.

However, there is a disadvantage in that durability and heat resistance of output products are low and manufacturing cost is high by the nature of manufacturing, compared with 3D printers of other methods.

Next, the selective laser sintering (SLS) method is a method of three-dimensionally outputting a product by stacking layers while coagulating after melting a large amount of small powdered plastic, metal, and glass block using a laser, and when the powder block is dusted off well after coagulating with a laser, the coagulated part remains, leaving a sculpture of a designed shape.

Although it is advantageous in that the output speed is high and it is possible to overcome the limit of material properties as a variety of materials are used, there is a disadvantage in that a printable size of a product is limited according to the size of a powder block, and the manufacturing cost is high compared with 3D printers of other methods.

The fused deposition modeling (FDM) method is a method of three-dimensionally outputting a product by melting a thermoplastic material inside a nozzle, pushing the melted material to the parts needed for making a desired shape, and solidifying the material to be stacked from the bottom, and the size and details of the layer are determined according to the speed and force of melting and pushing the material from the nozzle.

Although there is a disadvantage in that the surface of a molded product is rough and the output speed is low compared with other methods by the nature of the method of stacking and molding a material melted in the nozzle, while the molded product has advantages of excellent durability owing to high strength and humidity resistance, the fused deposition modeling (FDM) method is most widely used currently among the 3D printers as the structure is simple and the price of thermoplastic material, which is a molding material, is low.

The fused deposition modeling (FDM) method needs a process of heating up the nozzle to a high temperature to melt and push out the material, and the melted material discharged from the nozzle is solidified and shaped at room temperature.

As described above, in the fused deposition modeling (FDM) method, a device for heating the nozzle is essential, and in the prior art, an induction heating device is employed as a device for heating the nozzle.

A 3D printer of the fused deposition modeling (FDM) employing an induction heating apparatus of the prior art has a problem in that the preheating time is excessively increased according to a set temperature, and power consumption is excessively increased.

The background art of the present invention is disclosed in Korean Patent Registration No. 10-2016-0131954.

SUMMARY OF THE INVENTION

Therefore, the present invention has been made in view of the above problems, and it is an object of the present invention to provide a nozzle structure applying an RF heating device for a 3D printer, which can effectively melt a material using an RF frequency at the nozzle of the 3D printer, and maintain a proper temperature at the nozzle by minimizing transfer of heat, which is provided to the nozzle to melt the material, to the body.

Another object of the present invention is to provide a nozzle structure applying an RF heating device for a 3D printer, which can drastically reduce the preheating time of the 3D printer and effectively lower a precise temperature and power consumption for material melting.

To accomplish the above objects, according to one aspect of the present invention, there is provided a nozzle structure applying an RF heating device for a 3D printer, the nozzle structure comprising: a nozzle unit 100 for melting and discharging an inflowing material using heat transferred from the outside; a transfer unit 400 for transferring the material to the nozzle unit 100; an RF nozzle heating unit 500 for heating up the nozzle unit 100 using a high frequency so that the material is melted in the nozzle unit 100; and a cooling unit 200 for cooling down the heat discharged from the nozzle unit 100 to the outside.

Preferably, the nozzle unit 100 includes: a nozzle 110 having a screw unit 111 formed at an upper portion; a nozzle neck unit 120 having threads formed on the outer circumferential surface to be fixed to the cooling unit 200; a nozzle connection unit 130 for connecting the nozzle 110 and the nozzle neck unit 120; and a separation unit 140 provided in the nozzle connection unit 130 to separate the nozzle 110 and the nozzle neck unit 120.

Preferably, a female screw hole for coupling the nozzle neck unit 120 is formed at a lower portion of the cooling unit 200, the nozzle neck unit 120 is coupled to the female screw hole of the cooling unit 200 as threads are formed on the outer circumferential surface, the nozzle connection unit 130 has an inner space open up and down, female threads formed on the inner circumferential surface, and a side screw hole 131 penetrating toward the lateral side, and the separation unit 140 is formed as a bolt coupled to the side screw hole 131 of the nozzle connection unit 130 so that an end portion may protrude into the inner space of the nozzle connection unit 130.

Preferably, a female screw hole for coupling the nozzle neck unit 120 is formed at a lower portion of the cooling unit 200, the nozzle neck unit 120 is coupled to the female screw hole of the cooling unit 200 as threads are formed on the outer circumferential surface, the nozzle connection unit 130 has an inner space open up and down, and female threads formed on the inner circumferential surface, and the separation unit 140 is formed as a ring and inserted into the inner space of the nozzle connection unit 130.

Preferably, the nozzle connection unit 130 is made of a metal material and transfers heat of the nozzle unit 100 to the nozzle neck unit 120, and the separation unit 140 is made of a heat insulating material and prevents the heat of the nozzle unit 100 from being transferred to the nozzle neck unit 120.

Preferably, the nozzle unit 100 has threads 113 for absorbing heat of the RF nozzle heating unit 500 on the outer side, and the RF nozzle heating unit 500 includes: a heating coil 510 for generating heat while being wound around the nozzle unit 100 and in contact with the threads 113; and an RF radiation module unit 520 for providing thermal energy radiated to the heating coil 510 by adjusting power of an RF signal according to a set temperature to heat up the heating coil 510.

Preferably, the heating coil 510 is wound along the root of the threads 113.

Preferably, the RF radiation module unit 520 includes: an RF oscillator 521 for generating an RF signal; an RF amplifier 522 for amplifying and outputting the RF signal generated by the RF oscillator 521 by a gain control signal; an RF controller 523 for providing a gain control signal corresponding to a set temperature to the RF amplifier 522; and an RF radiator 524 for radiating the RF signal amplified by the RF amplifier 522 as thermal energy that is transferred to the heating coil 510.

DETAILED DESCRIPTION OF THE PREFERRED EMBODIMENT

Hereinafter, a nozzle structure applying an RF heating device for a 3D printer according to an embodiment of the invention will be described in detail with reference to the accompanying drawings.

Figure 1:
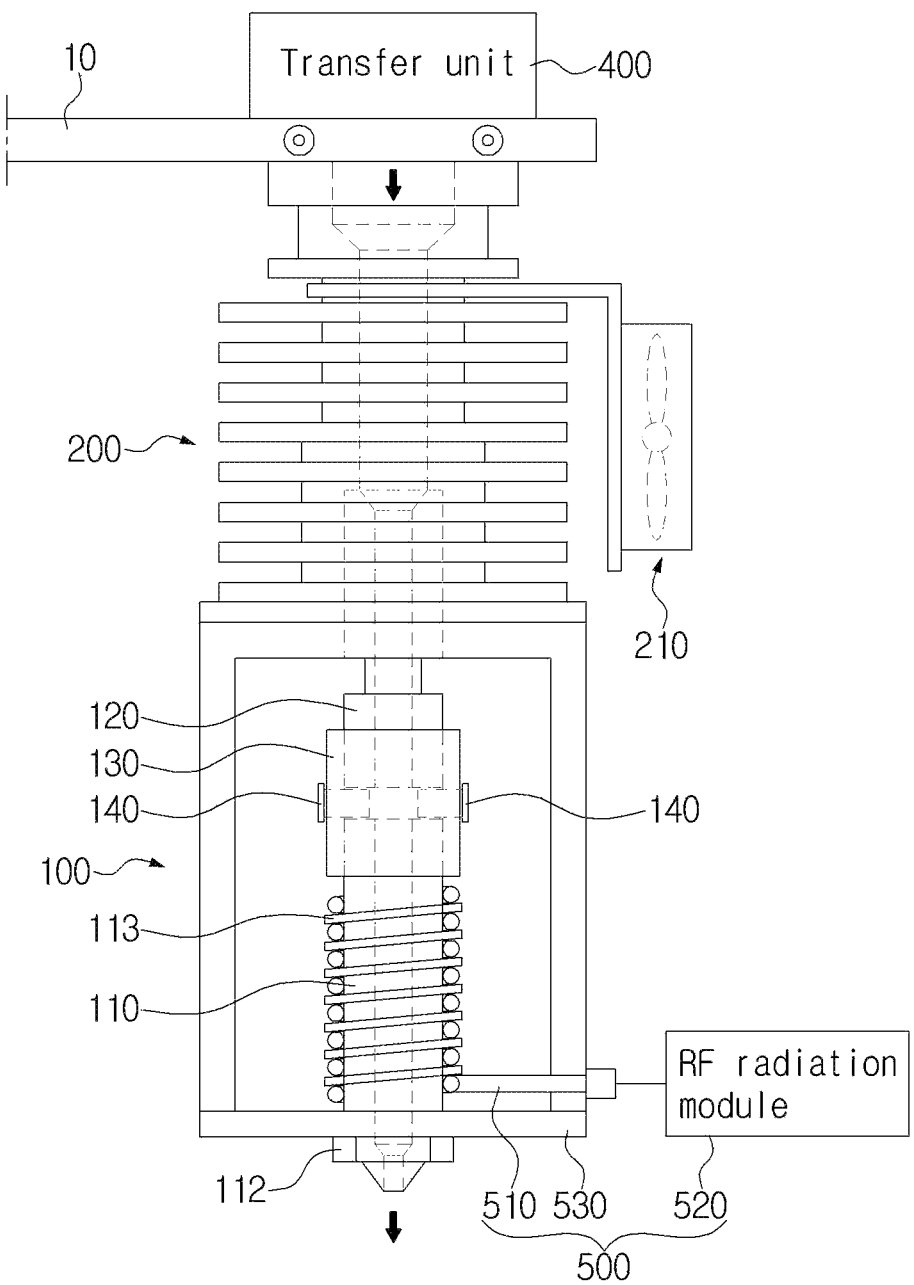
FIG. 1 is a view showing a nozzle structure applying an RF heating device for a 3D printer according to an embodiment of the present invention.
Figure 2:
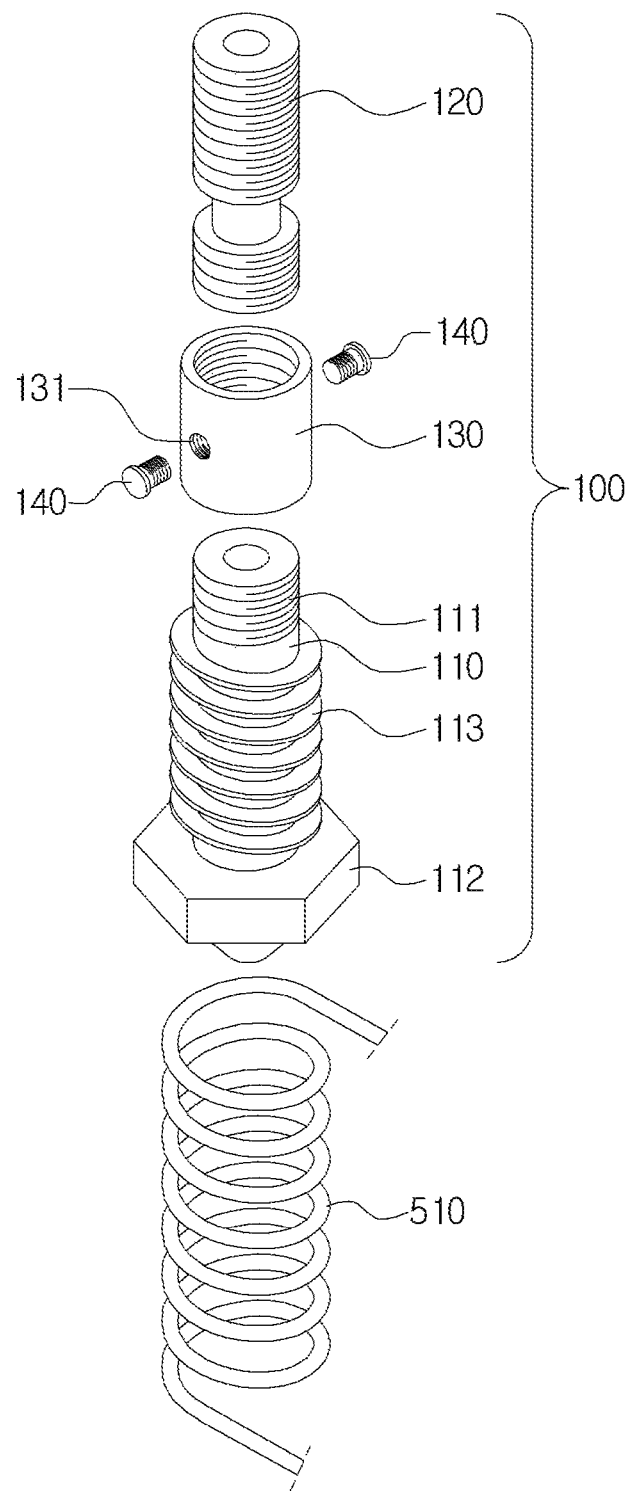
FIG. 2 is an exploded perspective view showing a major portion of the present invention.
Figure 3:
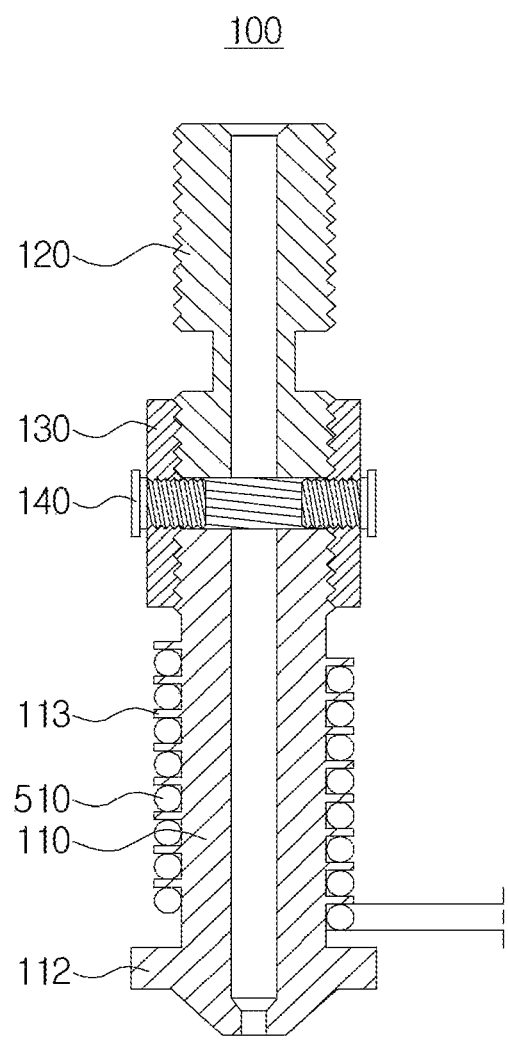
FIG. 3 is a cross-sectional view showing a combined state of FIG. 2.
Figure 4:
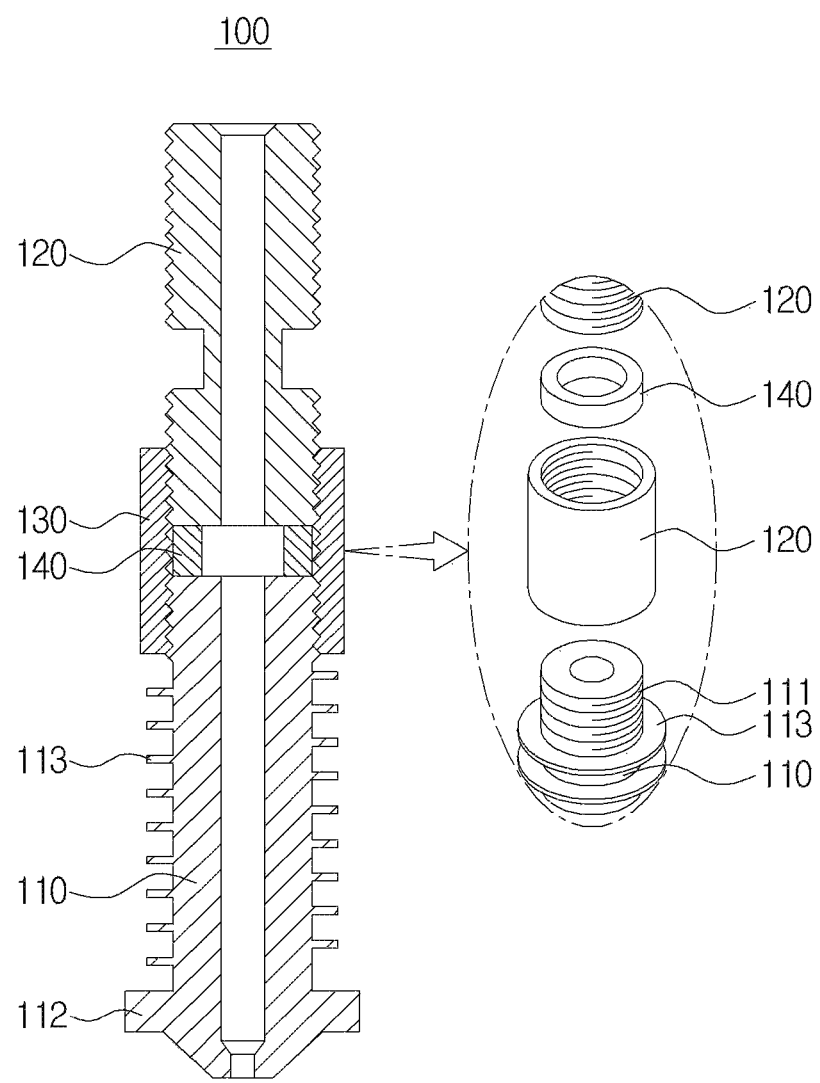
FIG. 4 is a view showing another major portion of the present invention.
Figure 5:
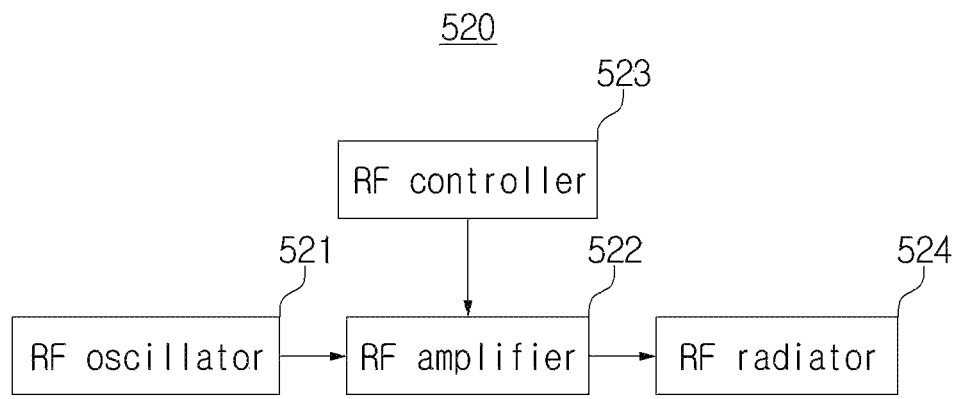
FIG. 5 is a block diagram showing an RF nozzle heating unit of the present invention.
Figure 6:
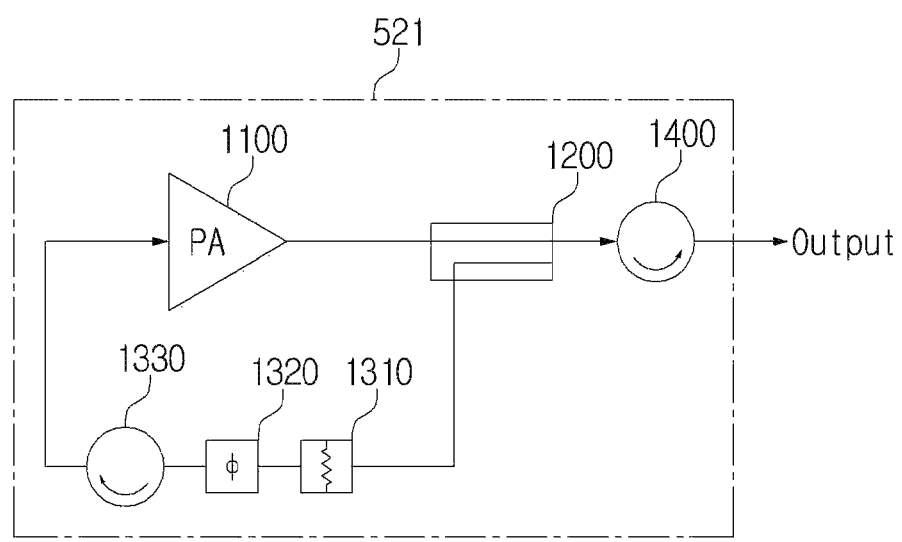
FIG. 6 is a circuit diagram showing an RF oscillator according to an embodiment, which is employed in an RF radiation module of the present invention.

As shown in FIGS. 1 to 6, a nozzle structure applying an RF heating device for a 3D printer includes a nozzle unit 100 for melting and discharging an inflowing material using heat transferred from the outside, a transfer unit 400 for transferring the material to the nozzle unit 100, an RF nozzle heating unit 500 for heating up the nozzle unit 100 using a high frequency so that the material is melted in the nozzle unit 100, and a cooling unit 200 for cooling down the heat discharged from the nozzle unit 100 to the outside.

First, the material may be configured of a thermoplastic.

The nozzle unit 100 includes a nozzle 110 having a screw unit 111 formed at an upper portion, a nozzle neck unit 120 having threads formed on the outer circumferential surface to be fixed to the cooling unit 200, a nozzle connection unit 130 for connecting the nozzle 110 and the nozzle neck unit 120, and a separation unit 140 provided in the nozzle connection unit 130 to separate the nozzle 110 and the nozzle neck unit 120.

In the nozzle 110, a passage through which a material moves is formed in the shape of a tubular body penetrating up and down, and includes the screw unit 111 formed at an upper portion to be fixed to the nozzle connection unit 130, a hexagonal head 112 of a hexagonal shape formed at a lower portion to rotate the nozzle 110, and threads 113 formed between the screw unit 111 and the hexagonal head 112 to absorb heat of the RF nozzle heating unit 500. The threads 113 are formed in a spiral shape.

Therefore, when heat is absorbed through the threads 113, the material may be melted and discharged from the nozzle 110.

In the nozzle neck unit 120, as the inner space through which the material moves is open up and down, and threads are formed on the outer circumferential surface, the upper portion is coupled to the female screw hole of the cooling unit 200, and the lower portion is connected to the nozzle connection unit 130.

Accordingly, the upper portion of the nozzle neck unit 120 is coupled and fixed to the cooling unit 200, and the lower portion of the nozzle neck unit 120 is coupled and fixed to the nozzle connection unit 130.

As the nozzle connection unit 130 is configured as a nut having female threads formed on the inner circumferential surface, the nozzle neck unit 120 is connected to the upper portion, and the screw unit 111 of the nozzle unit 100 is connected to the lower portion.

Then, the nozzle connection unit 130 has a side screw hole 131 formed to penetrate from the inside toward the lateral side. As the nozzle connection unit 130 like this may be made of a metal material to facilitate heat transfer, it may transfer the heat of the nozzle unit 100 to the nozzle neck unit 120.

Here, as the nozzle neck unit 120 is screw-coupled to the upper portion of the nozzle connection unit 130 and the nozzle unit 100 is screw-coupled to the lower portion of the nozzle connection unit 130, a correct position of the nozzle unit 100 may be set.

The separation unit 140 is formed as a bolt coupled to the side screw hole 131 of the nozzle connection unit 130 so that the end portion may protrude into the inner space of the nozzle connection unit 130. As the separation unit 140 like this may be made of a heat insulating material such as synthetic resin, it may prevent the heat of the nozzle unit 100 from being transferred to the nozzle neck unit 120.

Accordingly, after the bolt, which is the separation unit 140, is coupled to the side screw hole 131 of the nozzle connection unit 130, the nozzle neck unit 120 is coupled to the upper portion of the nozzle connection unit 130, and the nozzle unit 100 is coupled to the lower portion the nozzle connection unit 130.

In this state, the heat transferred from the nozzle unit 100 is transferred to the nozzle neck unit 120 through the nozzle connection unit 130. The heat transferred to the nozzle neck unit 120 is transferred to the cooling unit 200 and cooled down.

At this point, as the end portion of the nozzle unit 100 is spaced apart from, not in contact with, the end portion of the nozzle neck unit 120 by the separation unit 140, the heat of the nozzle unit 100 is not directly transferred to the nozzle neck unit 120. Accordingly, as heat loss of a heating coil 510 is minimized, a proper temperature may be continuously maintained at the nozzle 110.

In addition, the nozzle connection unit 130 described above may be made of a metal material without forming the side screw hole 131, and the separation unit 140 described above may be formed as a ring made of an insulating material.

Therefore, when the nozzle unit 100 is coupled to the lower portion of the nozzle connection unit 130 and the nozzle neck unit 120 is coupled to the upper portion of the nozzle connection unit 130 while the separation unit 140 is inserted inside the nozzle connection unit 130, the end portion of the nozzle unit 100 is supported at the lower portion of the separation unit 140, and the nozzle neck unit 120 is supported at the upper portion of the separation unit 140. That is, the nozzle unit 100 and the nozzle neck unit 120 are spaced apart.

Therefore, the material discharged from the nozzle unit 100 may be discharged in a melted state by the heat that is generated as the heater 500 operates.

At this point, as the nozzle unit 100 and the nozzle neck unit 120 are spaced apart from each other while being connected to the nozzle connection unit 130, the temperature of the nozzle unit 100 may be transferred to the nozzle neck unit 120 only through the nozzle connection unit 130. That is, the area to which the temperature of the nozzle unit 100 is transferred can be minimized.

Then, when the nozzle unit 100 or the nozzle neck unit 120 is deeply inserted into the nozzle connection unit 130, the area where the outer surface of the nozzle unit 100 or the nozzle neck unit 120 contacting the inner circumferential surface of the nozzle connection unit 130 can be increased. Of course, when the nozzle unit 100 or the nozzle neck unit 120 is lightly inserted into the nozzle connection unit 130, the area where the outer surface of the nozzle unit 100 or the nozzle neck unit 120 contacting the inner circumferential surface of the nozzle connection unit 130 can be minimized. That is, the area to which the heat is transferred can be adjusted in order of the nozzle unit 100, the nozzle connection unit 130, and the nozzle neck unit 120.

The transfer unit 400 supplies a material of a powder form or a linear form to the nozzle unit 100 in state of being provided in a 3D printer body 10.

The RF nozzle heating unit 500 includes a heating coil 510 for generating heat while being wound around the nozzle unit 100 and in contact with the threads 113, and an RF radiation module unit 520 for providing thermal energy radiated to the heating coil 510 by adjusting power of an RF signal in accordance with a set temperature to heat the heating coil 510.

The heating coil 510 may be formed in the shape of a coil, and may be made of a metal such as copper wound along the root of the threads 113. Accordingly, as the heat generated from the heating coil 510 is absorbed by the threads 113, the nozzle unit 100 may be heated.

The RF radiation module unit 520 may be configured to include an RF oscillator 521 for generating an RF signal, an RF amplifier 522 for amplifying and outputting the RF signal generated by the RF oscillator 521 by a gain control signal, an RF controller 523 for providing a gain control signal corresponding to a set temperature to the RF amplifier 522, and an RF radiator 524 for radiating the RF signal amplified by the RF amplifier 522 as thermal energy that is transferred to the heating coil 510.

The RF oscillator 521 may be configured to include a GaN power amplifier 1100, a directional coupler 1200, a phase shifter 1320, and a first isolator 1330.

Here, the GaN power amplifier 1100 is configured of a gallium nitride (GaN) device, and amplifies and outputs power of an input signal, and the directional coupler 1200 provides part of an output signal of the GaN power amplifier 1100 as a feedback signal.

In addition, the phase shifter 1320 changes the phase of the feedback signal provided by the directional coupler 1200, and the first isolator 1330 transfers the feedback signal to the GaN power amplifier 1100, and adjusts impedance mismatch generated by the phase shifter 1320.

Therefore, since the nozzle unit 100 is heated by the heat generated as the RF nozzle heating unit 500 operates, the material may be discharged while being melted in the nozzle unit 100. Since the heat is generated only by the heating coil 510 when the RF radiation module unit 520 is used, the RF radiation module unit 520 can be prevented from being damaged by the high temperature generated by the heating coil 510.

In addition, the RF nozzle heating unit 500 includes a heating cover unit 530 for minimizing heat loss by covering the heating coil 510.

The heating cover unit 530 is formed in the shape of a case having an inner space open toward the top, and is fixed to the lower portion of the cooling unit 200 in a state of surrounding the heating coil 510. At this point, the heating coil 510 is installed in a state penetrating the heating cover unit 530 while being wound around the nozzle unit 100.

In addition, the heating cover unit 530 may be configured of a heat insulation plate for blocking heat and a shield plate for shielding high frequencies. The heat insulation plate may be configured to include foamed styrol, and the shield plate may be configured to include a nickel-plated copper plate or an aluminum plate to block high frequencies generated from the heating coil 510.

In the cooling unit 200, a passage through which a material moves penetrates up and down, and a plurality of heat dissipation fins for air cooling is formed outside, and a female screw hole for coupling the nozzle neck unit 120 of the nozzle connection unit 130 described below is formed at a lower portion to communicate. Accordingly, since the cooling unit 200 is cooled down by air cooling of the heat dissipation fins, heat transferred from the nozzle unit 100 is prevented from being transferred to the 3D printer body 10 while preventing overheat of the nozzle unit 100.

In addition, as the cooling unit 200 is provided with a blowing fan 210 for forcibly moving air, cooling efficiency of the cooling unit 200 may be increased by air supply of the blowing fan 210.

As described above, as the present invention may effectively melt a material using an RF frequency at the nozzle of a 3D printer, and maintain a proper temperature at the nozzle by minimizing transfer of heat, which is provided to the nozzle to melt the material, to the main body, it can be said to be a very useful invention that can be applied to and widely used in a corresponding field.

The present invention has an advantage in that the degree of melting a material is uniform by effectively melting the material using an RF frequency at the nozzle of a 3D printer, and the body can be protected from the heat for melting the material as a proper temperature can be maintained at the nozzle by minimizing transfer of the heat, which is provided to the nozzle to melt the material, to the main body.

In addition, the present invention has an advantage of drastically reducing the preheating time of a 3D printer as the nozzle is heated using a high frequency, and effectively lowering a precise temperature and power consumption for material melting.

Those skilled in the art will appreciate that the present invention may be implemented in other specific forms without changing its technical spirit or essential features. Therefore, it should be understood in all respects that the embodiments described above are illustrative and not restrictive, and the scope of the present invention is indicated by the claims described below, rather than the detailed description, and the meaning and scope of the claims and all changed or modified forms derived from the equivalent concept thereof should be construed as being included in the scope of the present invention.

What is claimed is:

1. A nozzle structure for a 3D printer, the structure comprising:
    a nozzle unit for melting and discharging an inflowing material;
    a transfer unit coupled to the nozzle unit;
    a RF nozzle heating unit for heating up the nozzle unit using a high frequency so that the inflowing material is melted in the nozzle unit;
    a cooling unit for cooling down heat discharged from the nozzle unit;
    wherein the nozzle unit includes:
        a nozzle having a screw unit funned at an upper portion of the nozzle unit,
        a nozzle neck unit having threads formed on an outer circumferential surface of the nozzle neck unit,
        a nozzle connection unit for connecting the nozzle and the nozzle neck unit, and
        a separation unit to separate the nozzle and the nozzle neck unit;
    wherein the cooling unit has a female screw hole at a lower portion of the cooling unit;
    wherein the threads of the nozzle neck unit are coupled to the female screw hole of the cooling unit;
    wherein the nozzle connection unit includes:
        an inner space open up and down,
        female threads formed on an inner circumferential surface of the nozzle connection unit, and
        a side screw hole penetrating toward a lateral side of the nozzle connection unit; and
    wherein the separation unit is formed as a bolt and is coupled to the side screw hole of the nozzle connection unit so that an end portion of the holt may protrude into the inner space of the nozzle connection unit.

2. The nozzle structure according to claim 1, wherein the nozzle unit has threads on an outer side of the nozzle unit, and
    the RF nozzle heating unit includes:
        a heating coil in contact with the threads of the nozzle unit; and
        an RF radiation module unit for providing thermal energy.

3. The nozzle structure according to claim 2, wherein the heating coil is wound along a root of the threads of the nozzle unit.

4. The nozzle structure according to claim 2, wherein the RF radiation module unit includes:
    an RF oscillator for generating an RF signal;
    are RF amplifier for amplifying and outputting the RF signal generated by the RF oscillator;
    an RF controller for providing a gain control signal to the RF amplifier, wherein the gain control signal corresponds to a set temperature; and
    an RF radiator for radiating the RF signal amplified by the RF amplifier.

* * * * *